United States Patent
Scott

(10) Patent No.: US 10,676,210 B2
(45) Date of Patent: Jun. 9, 2020

(54) LOCK-DETECTING SYSTEM

(71) Applicant: Garmin International, Inc., Olathe, KS (US)

(72) Inventor: Milton E. Scott, Ottawa, KS (US)

(73) Assignee: Garmin International, Inc., Olathe, KS (US)

(*) Notice: Subject to any disclaimer, the term of this patent is extended or adjusted under 35 U.S.C. 154(b) by 266 days.

(21) Appl. No.: 15/892,992

(22) Filed: Feb. 9, 2018

(65) Prior Publication Data

US 2019/0248506 A1 Aug. 15, 2019

(51) Int. Cl.
*B64D 45/00* (2006.01)
*B64C 13/16* (2006.01)
*B64C 13/14* (2006.01)

(52) U.S. Cl.
CPC .......... *B64D 45/0005* (2013.01); *B64C 13/14* (2013.01); *B64C 13/16* (2013.01)

(58) Field of Classification Search
CPC ...... B64D 45/0005; B64C 13/14; B64C 13/16
USPC .............................................................. 701/3
See application file for complete search history.

(56) References Cited

U.S. PATENT DOCUMENTS

| 4,418,881 A * | 12/1983 | Bouldin | B64F 1/12 244/1 R |
|---|---|---|---|
| 5,209,429 A * | 5/1993 | Doolin | B64C 27/32 244/17.11 |
| 6,178,788 B1 * | 1/2001 | Winner | B60R 25/0221 70/38 C |
| 2008/0092609 A1 * | 4/2008 | Markbreit | E05B 67/383 70/254 |
| 2010/0019097 A1 * | 1/2010 | Probasco | B64F 1/005 244/224 |
| 2013/0113928 A1 * | 5/2013 | Feldman | H04N 7/183 348/143 |
| 2013/0192316 A1 * | 8/2013 | McKibben | E05B 49/00 70/278.1 |
| 2017/0015432 A1 * | 1/2017 | Ferreira | B64D 31/04 |

OTHER PUBLICATIONS

Printout from http://takeflightsandiego.com/assets/documents/SR22T%20GFC%20700%20Supplement.pdf Sep. 2014.

(Continued)

*Primary Examiner* — Krishnan Ramesh
(74) *Attorney, Agent, or Firm* — Samuel M. Korte; Max M. Ali

(57) ABSTRACT

A lock-detecting system is configured to be installed in an aircraft to determine if a gust lock is emplaced on a flight control surface. The lock-detecting system includes at least one servo actuator and a computing device. The at least one servo actuator is associated with the flight control surface of the aircraft such that the servo actuator is configured to supply a force to a flight control surface when engaged. The computing device is configured to instruct the at least one servo actuator to actuate the flight control surface, acquire an indication that the flight control surface did not move in response to said actuation by the servo actuator, and alert a pilot to remove the gust lock from the flight control surface.

20 Claims, 7 Drawing Sheets

(56) References Cited

OTHER PUBLICATIONS

Printout from https://www.aironline.com/aviation-news/business-aviation/2015-09-09/ntsb-faults-pilot-compliance-gust-lock-giv-crash Sep. 2015.
Printout from http://harrisburgpilots.com/uploads/3/4/2/1/34218799/poh_oy-bhi_c172n.pdf section 4-5 and 4-6; Jul. 1979.
Printout from https://en.wikipedia.org/wiki/Gust_lock dated prior to Feb. 9, 2018.

* cited by examiner

LOCK-DETECTING SYSTEM

BACKGROUND

Aircraft, watercraft, and other vehicles may employ manual locks to prevent damage to or movement of the vehicle. In an example of aircraft, the pilot may affix gust locks (also known as flight control locks or control locks) to the various control surfaces of the aircraft. The gust locks prevent damage to the control surface caused by wind and other environmental factors when the aircraft is not in use. The gust locks mechanically prevent movement of the control surface. Various gust locks can range from integral systems to hand-made, improvised wedges. The pilot must remove the gust locks as a step of pre-flight checks on the aircraft. Unfortunately, pilots can forget to remove gust locks before flight.

SUMMARY

In embodiments, a lock-detecting system is configured to be installed in an aircraft to determine if a gust lock is emplaced on a flight control surface. The lock-detecting system comprises at least one servo actuator and a computing device. The at least one servo actuator is associated with the flight control surface of the aircraft such that the servo actuator is configured to supply a force to a flight control surface when engaged. The computing device is configured to instruct the at least one servo actuator to actuate the flight control surface, acquire an indication that the flight control surface did not move in response to said actuation by the servo actuator, and alert a pilot to remove the gust lock from the flight control surface.

This Summary is provided solely to introduce subject matter that is fully described in the Detailed Description and Drawings. Accordingly, the Summary should not be considered to describe essential features nor be used to determine a scope of the claims. This summary is not intended to identify key features or essential features of the claimed subject matter, nor is it intended to be used to limit the scope of the claimed subject matter. Other aspects and advantages of embodiments of the invention will be apparent from the following detailed description of the embodiments and the accompanying drawing figures.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

The following detailed description references the accompanying drawings that illustrate specific embodiments in which embodiments of the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, embodiments of the invention can include a variety of combinations and/or integrations of the embodiments described herein.

It should be appreciated that while the following disclosure refers to aircraft, embodiments of the invention may be utilized with other types of vehicles. In some exemplary embodiments of the invention, the lock-detecting system interacts with a boat, a spacecraft, a missile, or other vehicle. It should therefore be noted that throughout the description, "aircraft" could be replaced with "boat," "spacecraft," "missile," "vehicle," or the like; and "pilot" could be replaced with "sailor," "captain," "helmsman," "astronaut," "operator," or the like. In some embodiments, such as with a missile or unmanned aerial vehicle, the pilot may be remote from the vehicle.

Exemplary Environment

Figure 1:
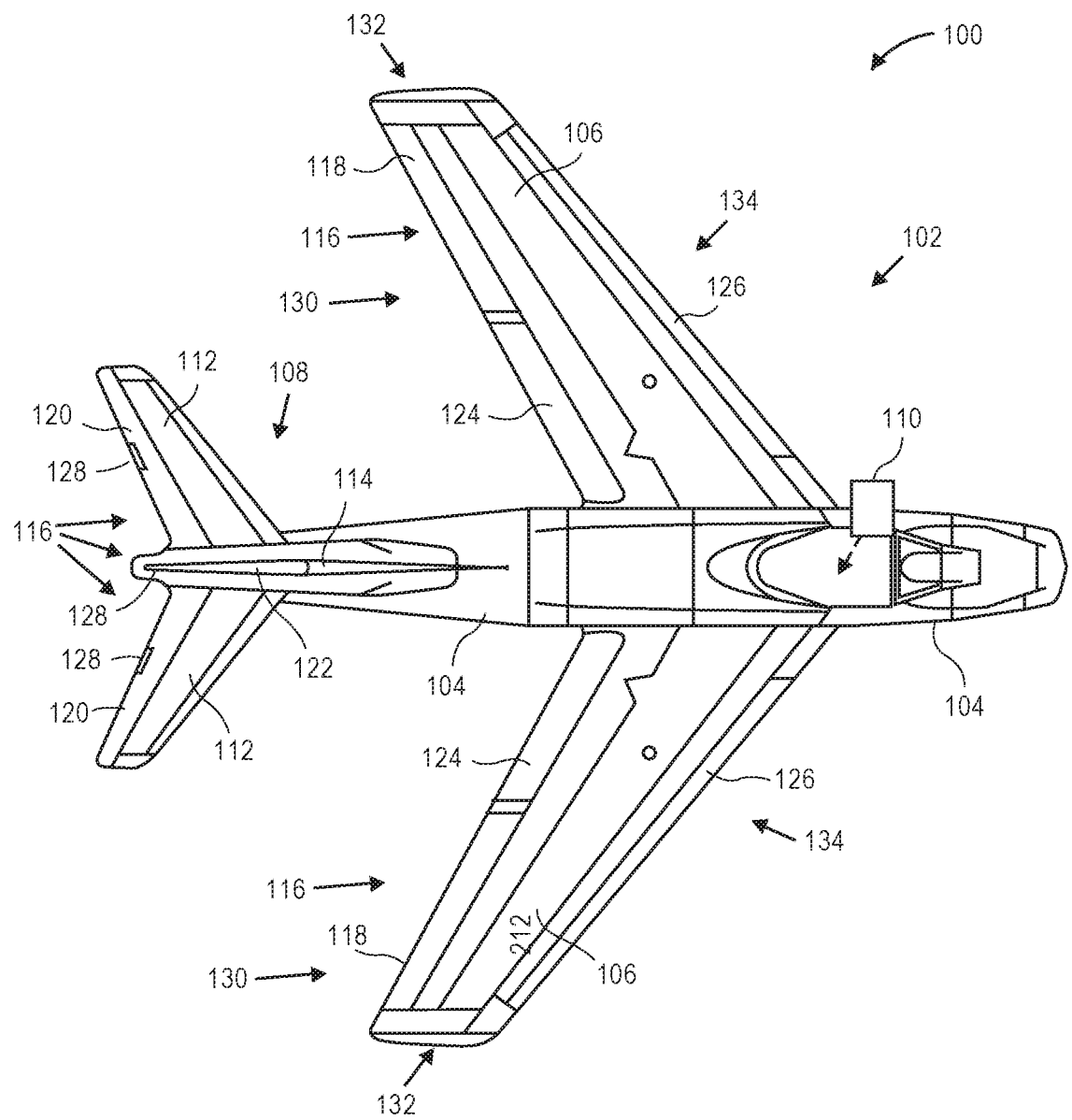
FIG. 1 is a top view of an exemplary aircraft, namely an airplane, equipped with a lock-detecting system.

Embodiments of the invention may be used in an environment of an aircraft 100. As illustrated in FIG. 1, in some embodiments the aircraft 100 may be an airplane 102 or other fixed-wing aircraft, such as an unmanned aerial vehicle. The airplane 102 generally includes a fuselage 104, a set of wings 106, and a tail 108. The fuselage 104 may include an engine, a cockpit, a transmission, a fuel system, a control system, landing gear, and the like. A lock-detecting system 110, for performing the functions discussed herein may be disposed at least partially within the cockpit of the fuselage 104, or in another appropriate location. The set of wings 106 generates the lift that elevates the airplane 102. The tail 108 may include a horizontal stabilizer 112 and a vertical stabilizer 114.

The airplane 102 includes various flight control surfaces 116 for controlling the aircraft 100 in flight. Example flight control surface 116 include ailerons 118, elevators 120, a rudder 122, flaps 124, spoilers 126, and trim tabs 128. The aircraft 100 may include any or all of these flight control surface 116. The flight control surface 116 are movable relative to the fuselage 104 to alter the flow of air over the aircraft 100. The altered flow of air will affect the aircraft 100 in various ways such as by changing the orientation of the aircraft 100 relative to the ground, increasing or decreasing the generated lift, or increasing or decreasing the generated drag.

Ailerons 118 are mounted on a trailing edge 130 of the wing, typically near wingtips 132, to control the roll (rotation about a longitudinal axis) of the aircraft 100. Elevators 120 are mounted on a trailing edge 130 of the horizontal stabilizer 112 to control the pitch (rotation about a lateral axis) of the aircraft 100. Rudders 122 are mounted on a trailing edge 130 of the vertical stabilizer 114 to control the yaw (rotation about a vertical axis) of the aircraft 100. Spoilers 126 are mounted to a leading edge 134 of the wing disrupt airflow over the wing and reduce lift (allowing a loss of altitude without excessive speed gains). Flaps 124 are mounted to the trailing edge 130 of the wing to greatly increase lift (such as is needed at takeoffs and landings). The trim tabs 128 allow the pilot to balance the lift and drag being produced by the wings 106 and flight control surfaces 116. This reduces the effort required to adjust or maintain a desired flight attitude.

Each control surface may be moved by an actuator servo (shown in FIGS. 3-5), in a fly-by-wire system or by a mechanical linkage (not illustrated) in a non-fly-by-wire system. The lock-detecting system 110 may also include actuator servos for moving the flight control surfaces 116 during autopilot functions (as discussed below) or be configured as a stand-alone system. The actuator servos used by the lock-detecting system 110 may be the same as or different than the actuator servo used by standard flight controls in a fly-by-wire system. In some configurations, the aircraft 100 may be equipped with a single servo for providing control along one axis (e.g., a wing leveler), dual servos for providing control along two axes (e.g., pitch and roll), or three or more servos for providing control along three axes (e.g., pitch, roll, yaw).

As discussed above, wind and other environmental factors can damage the flight control surfaces 116 of an aircraft 100 that is parked. This is because the wind or other environmental factors may cause the flight control surface 116 to move in an unexpected and potentially damaging manner. Typically, this damage is prevented or reduced by the use of a gust lock (also known as a flight control lock or control lock) on some or all of the flight control surfaces 116. A gust lock (not illustrated) is a mechanical device that prevents some or all of the movement of the flight control surface 116. Gust locks are typically installed after the aircraft 100 is parked and removed before moving the aircraft 100. In some situations, gust locks are installed on the exterior of the aircraft, such as near, through, or on the ailerons, elevators, and/or rudders. In other situations, a gust lock may be installed inside the aircraft's cabin, such as on the aircraft's controls (e.g., yoke, stick, throttle, etc.). As discussed below, the lock-detecting system 110 determines whether the gust locks are in place during a startup sequence so that the pilot can be alerted to remove the gust locks before flight.

Figure 2:
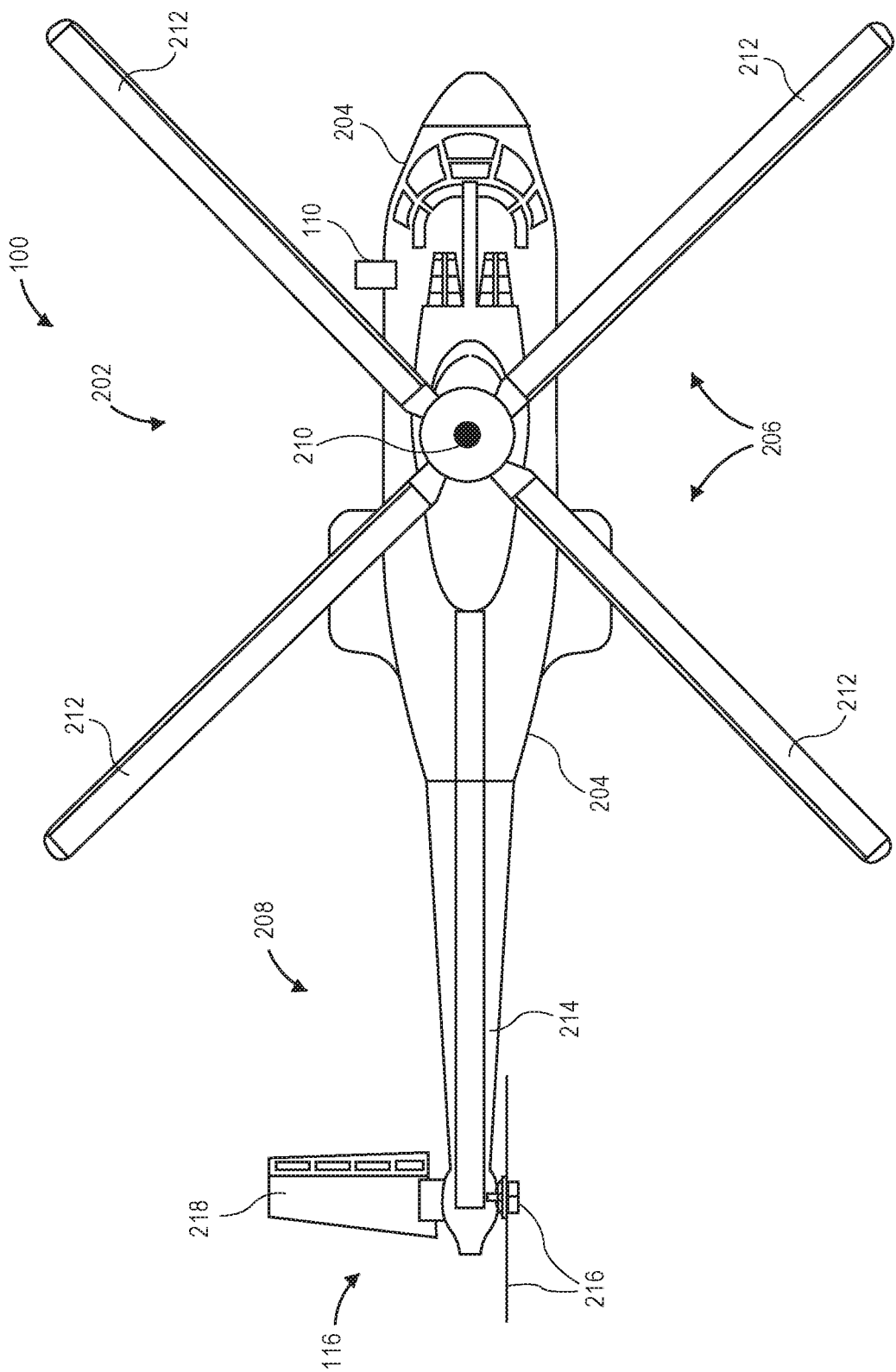
FIG. 2 is a top view of an exemplary aircraft, namely a helicopter, equipped with a lock-detecting system.

As illustrated in FIG. 2, in some embodiments of the invention the aircraft 100 may be a helicopter 202 or other rotary-wing aircraft. The helicopter 202 may include a fuselage 204, a main rotor 206, and a tail 208. The main rotor 206 may include a rotor mast 210 and a plurality of main rotor blades 212. The main rotor 206 is powered by the engine. The tail 208 may include a tail boom 214, a tail rotor 216, and a tail stabilizer 218. Unlike an airplane 102 as described above, the flight control of a helicopter 202 is performed partially or fully without flight control surfaces 116. Instead, the flight control is achieved through manipulation of the two sets of rotors 206,216. The controls are achieved through a cyclic (controlling the overall pitch of the main rotor 206 so as to move the helicopter 202 laterally forward, backward, and sideways), a collective (controlling an angle of attack for the main rotor blades 212 of the main rotor 206 so as to move the helicopter 202 up and down), anti-torque pedals (controlling the rotation speed and/or angle of attach of the tail rotor 216 so as to control the yaw of the helicopter 202) and throttle (controlling the rotation speed of the main rotor 206). Some helicopters 202 use some or all of the above-discussed flight control surfaces 116 to supplement the standard flight controls of the helicopter 202. Pilots may therefore use gust locks on helicopters 202 to secure these secondary flight control surfaces 116, the main rotor 206, the tail rotor 216, or other component of the helicopter 202. Additionally or alternatively, gust locks may be secured on the collective, throttle, and/or cyclic controls of the helicopter 202.

It should therefore be appreciated that various embodiments of the invention may be utilized in fixed-wing aircraft (such as illustrated in FIG. 1), in rotary-wing aircraft (such as illustrated in FIG. 2), in unmanned aerial vehicles (not illustrated), in watercraft (not illustrated), or in other aircraft or vehicles. The lock-detecting system 110 and method may be implemented in hardware, software, firmware, or a combination thereof. In various embodiments, the invention is implemented with an assisted flight computer program integrated into a lock-detecting system 110. The lock-detecting system 110 and computer programs illustrated and described herein are merely examples of computer equipment and programs that may be used to implement the present invention and may be replaced with or supplemented with other avionics equipment and computer programs without departing from the scope of the present invention.

It should be noted that the features of the present invention may be incorporated into any components of the lock-detecting system 110. For example, the features could be implemented in the lock-detecting system 110, a separate autopilot controller, an existing flight control system, and/or any other avionics suite component. The features may also be distributed among the components of the lock-detecting system 110. Finally, the features may be implemented in a stand-alone device, which is then interfaced to a more traditional avionics suite. Thus, while certain features are described as residing in the computing device, the features may be implemented elsewhere.

Exemplary Modes

The functionality provided by the lock-detecting system 110 may be available in various modes and may be at least partially dependent upon other interfaced equipment. Typically, and as discussed below, the gust lock detection steps will be performed before flight begins, such as during start-up operations prior to taxi. In some embodiments, once flight begins, the lock-detecting system 110 will perform autopilot functions according to the various modes. In embodiments of the invention, the lock-detecting system 110 will provide the functions including a stability augmentation system mode (sometimes referred to as an SAS mode) and a flight director mode. Before discussing the lock detection functionality in more detail, the various modes will be discussed so as to orient the reader as to the possible modes and functions that may be available and utilized in embodiments of the invention.

A stability augmentation system supplies short-term attitude and attitude rate stabilization for use in hands-on flying. It is referred to as a stability augmentation system because it stabilizes the airplane 102 or other aircraft 100 against outside disturbances, and augments or helps pilot input. The stability augmentation system mode is designed so that pilot control motions (for example, pitch and roll) are enhanced while airplane 102 motions caused by outside disturbances are counteracted. This mode of operation improves basic airplane 102 handling qualities.

The stability augmentation system modes may include pitch and roll force trim, pitch and roll stability augmentation, and attitude hold. The pitch and roll force trim function provides a detent position in which the controls will satisfy the current commanded attitude and provides a reference for the pilot to move the controls to achieve attitudes other than those commanded. The pitch and roll stability augmentation function provides control inputs to minimize attitude rates to improve flight characteristics. Stability augmentation is provided around a reference attitude. The attitude hold function provides control inputs to maintain the pitch and roll references selected by the pilot.

A flight director provides the pilot and/or autopilot with computed lateral and vertical steering commands to fly the aircraft 100 along a desired lateral and vertical flight path. The flight director has different lateral and vertical modes the pilot can use in each of these segments. Flight Director modes refers to the higher-level modes available within the system. Not all installations will include a display of flight director. For installations that do include a display of flight director the flight control system can be selected to be coupled to the flight director or decoupled in which case the flight control system is providing attitude hold functions and the pilot manually satisfies the flight director commands. One or more of the following modes may be provided: an attitude hold mode (which may be the same function or similar to that as provided in stability augmentation system mode); an indicated airspeed hold mode (which provides pitch attitude inputs to maintain the selected airspeed); and altitude capture and hold mode (which provides pitch attitude inputs to capture and maintain the selected barometric altitude); a vertical speed hold mode (which provides pitch attitude inputs to capture and maintain the selected vertical speed); a heading select mode (which provides roll attitude inputs to capture and maintain the selected heading); a navigation mode (which provides roll inputs to capture and maintain the selected VHF or GPS navigation guidance); and approach mode (which provides pitch and roll inputs to capture and maintain the selected VHF or GPS approach guidance); and/or a yaw axis stability augmentation and control mode (which provides heading hold at low speed and turn coordination at higher speeds). Other modes and functions may also be available.

Exemplary System Hardware

Figure 3:
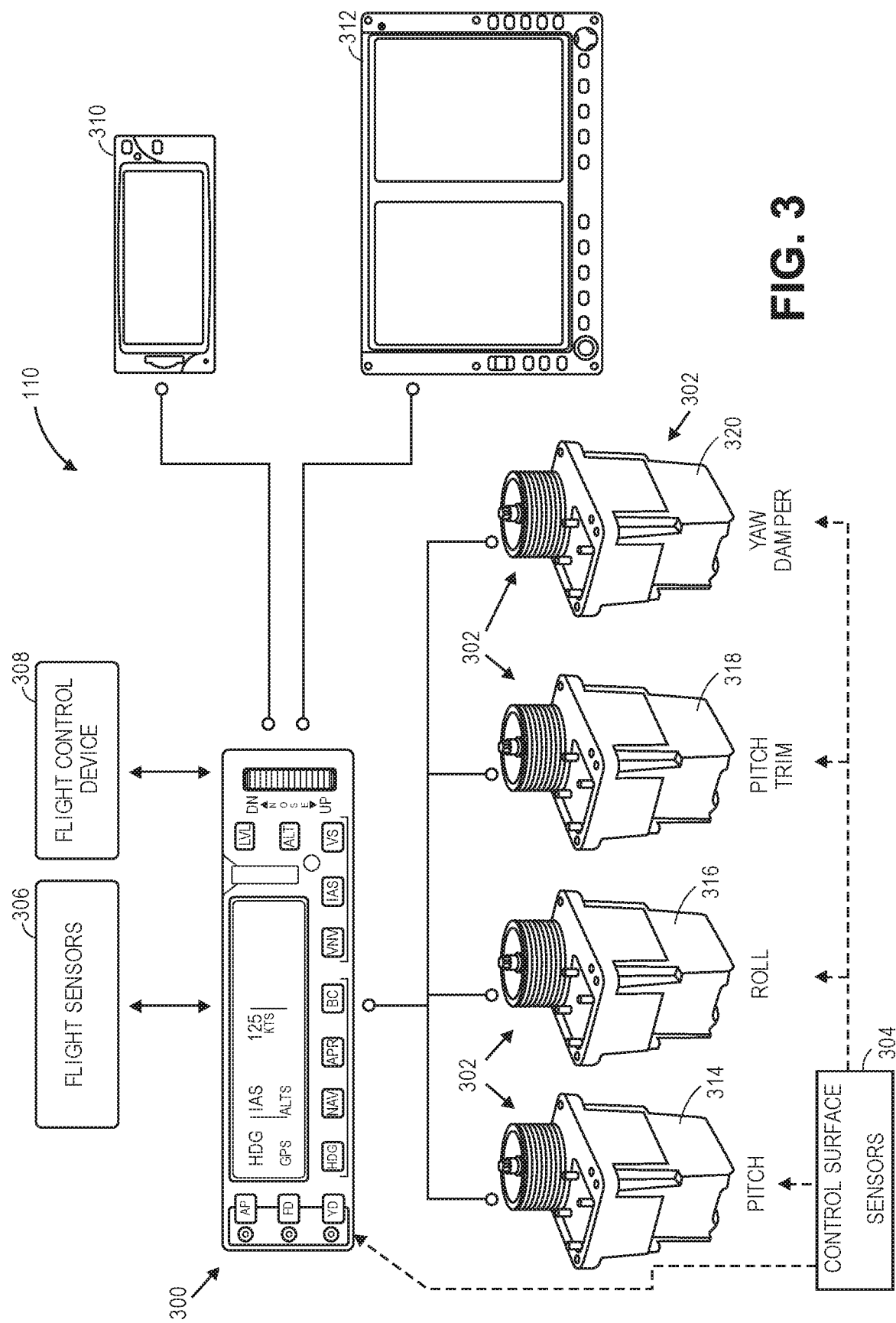
FIG. 3 is a schematic illustration of various hardware components associated with the exemplary lock-detecting system of FIG. 1.

Various system hardware components that may be included in or associated with embodiments of the invention will now be discussed. Exemplary hardware is illustrated in FIG. 3, which shows a schematic representation of the various hardware components. It should be appreciated that the hardware shown is to aid the reader in understanding various embodiments of the invention. Other embodiments of the invention may utilize different hardware, or hardware arranged and associated in another way.

Figure 6:
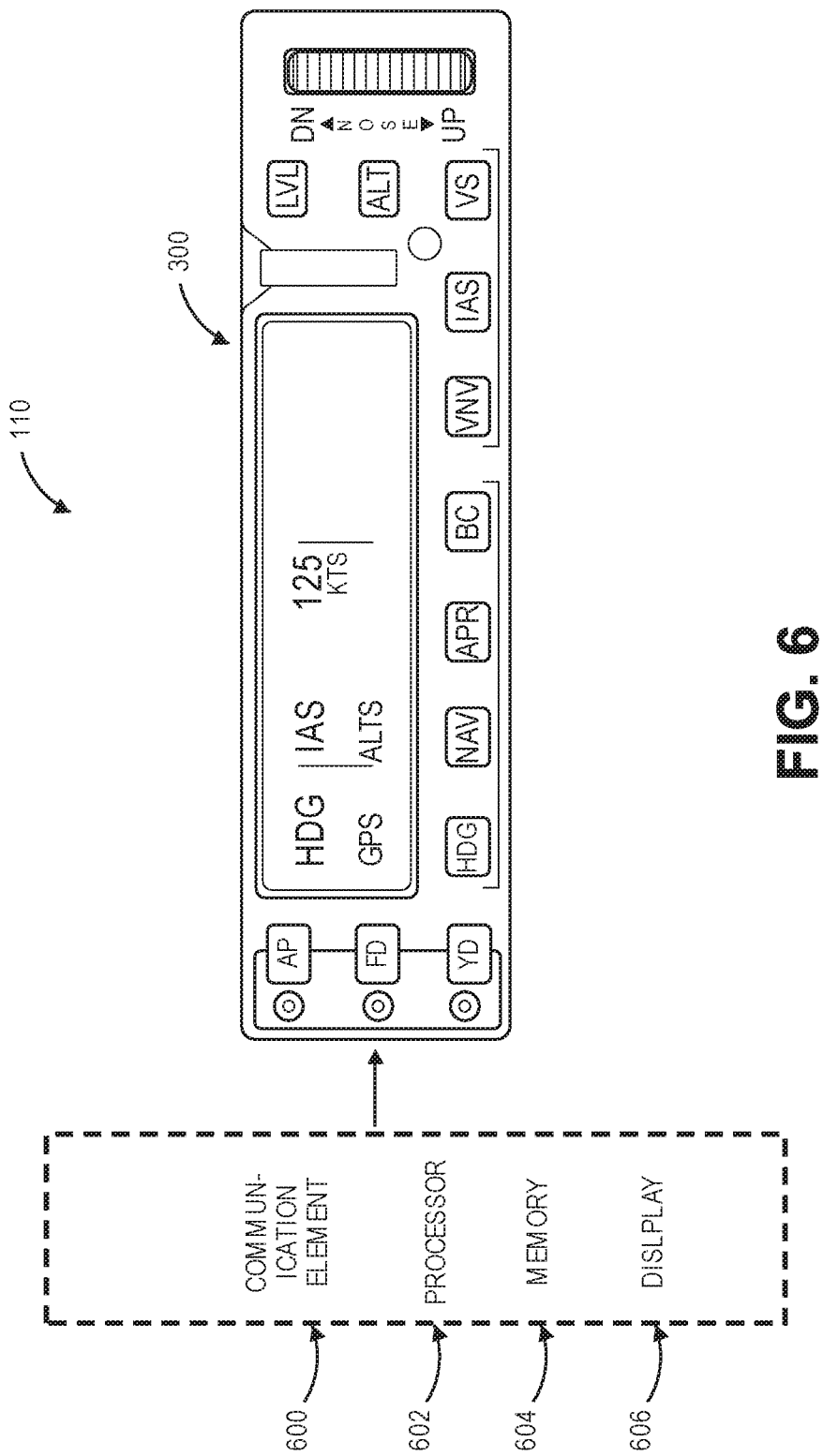
FIG. 6 is a schematic illustration of various computing device hardware components.

Components of and/or associated with the lock-detecting system 110 are illustrated in FIG. 3. In some embodiments, the lock-detecting system 110 includes a computing device 300 and at least one servo actuator 302. In some embodiments, the lock-detecting system 110 further includes a control surface sensor 304, which may be a component of the servo actuator 302 or an independent component. In some embodiments, the lock-detecting system 110 interfaces with or is otherwise associated with a set of flight sensors 306, a set of flight control devices 308, a navigator 310, and a flight display 312. In some embodiments, the lock-detecting system 110 includes the computing device 300, at least one servo actuator 302, and at least one control surface sensor 304. Exemplary components of the computing device 300 are shown in FIG. 6 and discussed below.

Figure 4:
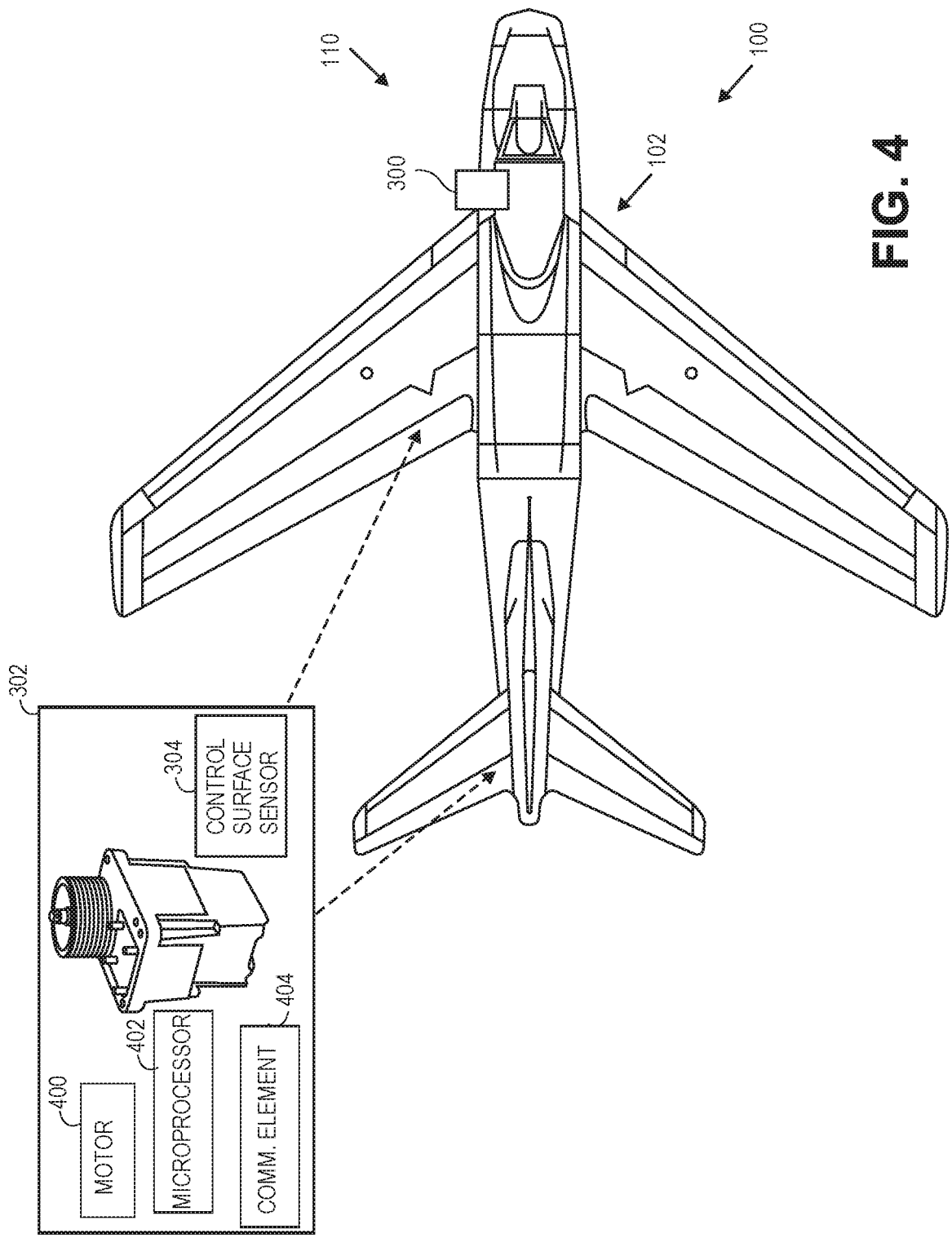
FIG. 4 is a top view illustrating a combined servo actuator and control surface sensor being disposed adjacent to various flight control surfaces.
Figure 5:
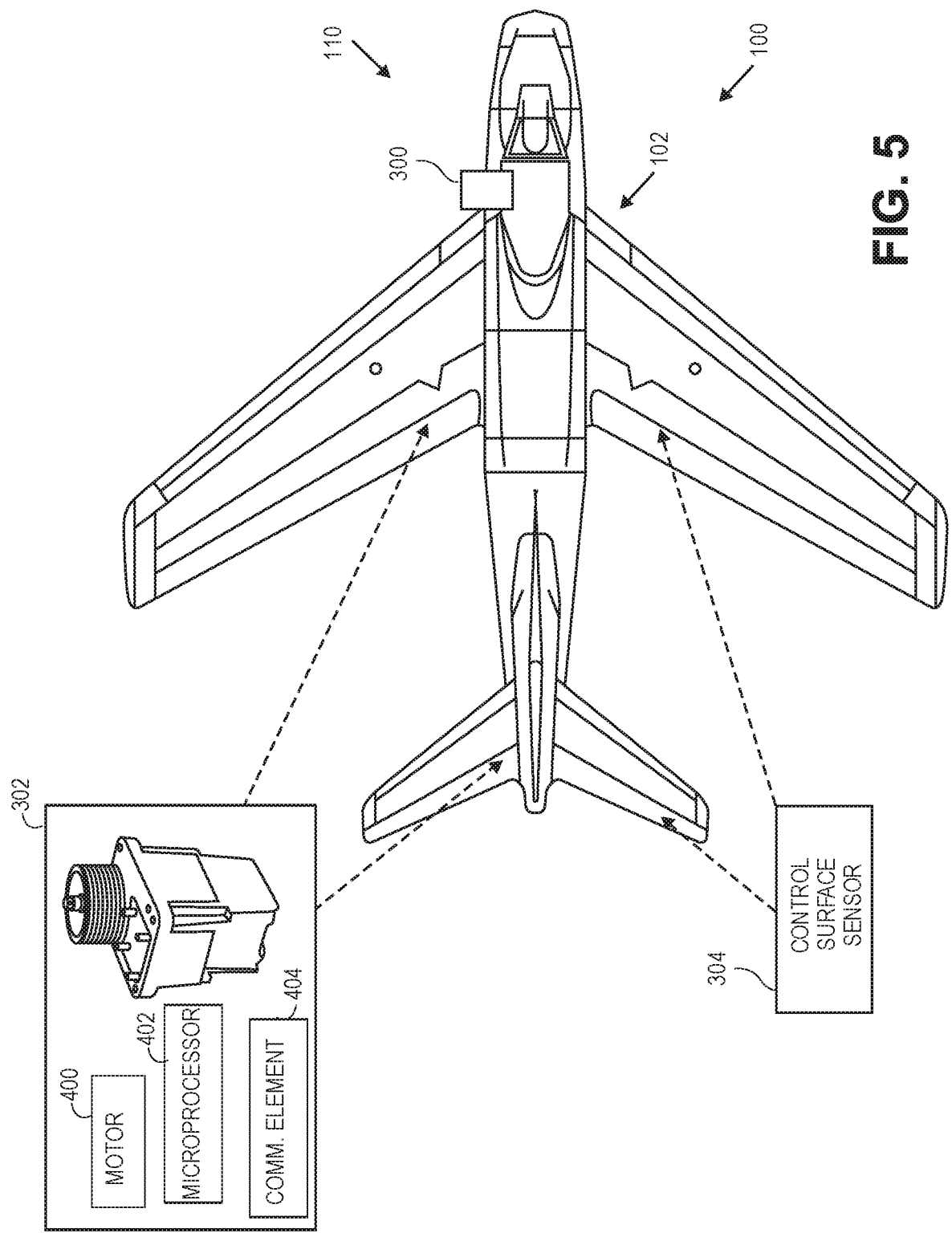
FIG. 5 is a top view illustrating a separate servo actuator and control surface sensor each being independently disposed adjacent to the various flight control surfaces.

In embodiments, the servo actuator 302 is a rotary actuator and/or a linear actuator. In one example, the servo actuator 302 is a Garmin GSA 28, GSA 80/81, GSA 87, or similar Garmin servo. The servo actuator 302 provides control over the angular and/or linear position of the flight control surface 116. As illustrated in FIGS. 4 and 5, the servo actuator 302 includes a motor 400 that performs the linear and/or angular actuation. The servo actuator 302 may include a microprocessor 402 for instructing the motor to actuator, and to provide an amount, degree, angle, or distance of the actuation. The servo actuator 302 may include a communication element 404 for communicating with the computing device 300. The servo actuator 302 may include a position sensor for determining a position of the servo actuator 302 (or a component thereof), as discussed more below.

Returning to FIG. 3, four exemplary servo actuators 302 are illustrated. These include a pitch servo 314, a roll servo 316, a pitch trim servo 318, and a yaw damper servo 320. The pitch servo 314 is mounted adjacent to and interfacing with the elevators 120. The roll servo 316 is mounted adjacent to and interfacing with the ailerons 118. The pitch trim servo 318 is mounted adjacent to and interfacing with the trim tab on the elevators 120. The yaw damper servo 320 is mounted adjacent to and interfacing with the rudder 122. It should be appreciated that other embodiments of the invention may utilize more or fewer servo actuators 302, or the servo actuators 302 may be in a different arrangement.

FIGS. 4 and 5 illustrate two exemplary embodiments of the invention. In FIG. 4, the control surface sensor 304 is a component of the servo actuator 302. As such, the servo actuator 302 and the control surface sensor 304 are co-located. In some embodiments, the control surface sensor 304 is located within a housing of the servo actuator 302. In FIG. 5, the control surface sensor 304 is separate and distinct from the servo actuator 302. As such, the servo actuator 302 is not necessarily co-located with the control surface sensor 304.

The flight sensor 306 may include various devices which sense the state of certain aspects of the aircraft 100 during flight. The flight sensor 306 may comprise an attitude heading and reference system (AHRS), a gyroscope, a compass, a GPS receiver, etc. However, the flight sensor 306 may be any flight sensors known in the art and may measure a variety of flight conditions. For example, the flight sensor 306 may indicate bank angle, pitch attitude, G loading, an altitude of the aircraft 100, an airspeed of the aircraft 100, a flight plane for the aircraft 100, fuel level, a wind speed experienced by the aircraft 100, a wind direction experienced by the aircraft 100, a temperature experienced by the aircraft 100, a weather condition experienced or predicted to be experienced by the aircraft 100, an engine temperature experienced by the aircraft 100, a structural load experienced by the aircraft 100, combinations thereof, and the like.

The flight control device 308 may be any flight control device 308 known in the art for flight control. The flight control device 308 may be mechanically controlled (such as in a non-fly-by-wire aircraft), electrically controlled (such as in a fly-by-wire aircraft), or a combination thereof. For example, the flight control device 308 may be a yoke, a stick, a control column, a control wheel, a sidestick controller, a throttle lever, a throttle knob, a throttle wheel, a trim wheel, or any other device that is mechanically connected to a control mechanism of the aircraft 100. The control device 308 may be connected directly or indirectly to any of a plurality of flight control surfaces 116, engine controls, system controls, or the set of servo actuators 302.

The navigator 310 aids the pilot in navigating to various locations. The navigator 310 may include or be associated with a location element, such as a global positioning system (GPS) receiver. The navigator 310 may also be loaded with or have access to various databases of information, such as a map database, a navigation database, a terrain database, an obstacle database, a safe taxi database, a flight chart database, a flight plans database, or other database. The navigator 310 may also include a graphical interface display to show maps, navigation, flight planning, and other information to the pilot.

The flight display 312 presents information to the pilot to aid the pilot in piloting the aircraft 100. In addition to associations with the navigator 310 and the computing device 300, the flight display 312 may also be associated with the AHRS, radios, radars, the flight sensors 306, and other aircraft systems.

Example Computing Device Hardware

The above-discussed components may interface with or otherwise be associated with the computing device 300. Exemplary components of the computing device 300 are illustrated in FIG. 4. It should be appreciated that FIG. 6 shows another version of a computing device 300 that can be used in various embodiments of the invention that is shown in FIG. 3, so as to provide additional examples to the reader. The computing device 300 determines and instructs the various functions described herein. The computing device 300 may include a communications element 600, a processor 602, a memory 604, and a display 606.

The communications element 600 permits the computing device 300 to send and receive data between different devices (e.g., the control surface sensors 304, the servo actuators 302, and other aircraft systems) and/or over the one or more networks. The communications element 600 includes one or more Network Interface Units. NIU may be any form of wired or wireless network transceiver known in the art, including but not limited to networks configured for communications according to the following: one or more standards of Aeronautical Radio, Incorporated (ARINC); one or more standards of the Garmin International avionics network (GIA), such as a High Speed Data Bus (HSDB); and the like. Wired communications are also contemplated such as through universal serial bus (USB), Ethernet, serial connections, and so forth. Computing device 300 may include multiple NIUs for connecting to different networks or a single NIU that can connect to each necessary network.

The communications element 600 may also have a wired and/or wireless connection to the set of servo actuators 302 and/or a vehicle-area network (VAN) for the aircraft 100 in which it is used. The lock-detecting system 110 may include or interface with the primary flight display 312 or other multifunction display. The lock-detecting system 110 may display information received from the lock-detecting system 110 for the pilot. The VAN may connect various aircraft systems, such as the set of servo actuators 302, the set of control surface sensors 304, the set of flight sensors 306, an attitude and heading reference system (AHRS), a flight management system, a terrain awareness and warning system (TAWS), a flight control system, global positioning systems, radios/satellites and other external communication devices, and vehicle (i.e., aircraft 100) controls. It may also be referred to as a Controller Area Network (CAN). The lock-detecting system 110 may send commands or messages to the CAN. The VAN may also include one or more integrated displays and/or speakers for the pilot. When this is the case, lock-detecting system 110 may not include its own display but instead use the aircraft's integrated display, or both. Alternatively, VAN may not integrate into the aircraft 100 itself, but rather connect peripherals and other devices installed in or used in the aircraft 100.

The lock-detecting system 110 may also include a processor 602. The processor 602 provides processing functionality for the lock-detecting system 110 and may include any number of processors, micro-controllers, or other processing systems, and resident or external memory for storing data and other information accessed or generated by the lock-detecting system 110. The processor 602 may execute one or more software programs that implement the techniques and modules described herein. The processor 602 is not limited by the materials from which it is formed or the processing mechanisms employed therein and, as such, may be implemented via semiconductors and/or transistors (e.g., electronic integrated circuits (ICs)), and so forth. It should also be appreciated that the discussed functions and methods performed by the processor 602 of the lock-detecting system 110 may be performed by other processors. Similarly, the described structure of the processor 602 may also describe corresponding structure on other processors.

The lock-detecting system 110 may also include a memory 604. The memory 604 is an example of device-readable storage media that provides storage functionality to store various data associated with the operation of the lock-detecting system 110, such as the software program and code segments discussed below, or other data to instruct the processor 602 and other elements of the lock-detecting system 110 to perform the techniques described herein. A wide variety of types and combinations of memory may be employed. The memory 604 may be integral with the processor 602, a stand-alone memory, or a combination of both. The memory 604 may include, for example, removable and non-removable memory elements such as RAM, ROM, Flash (e.g., SD Card, mini-SD card, micro-SD Card), magnetic, optical, USB memory devices, and so forth. In embodiments of the invention, the memory 604 may include removable ICC (Integrated Circuit Card) memory such as provided by SIM (Subscriber Identity Module) cards, USIM (Universal Subscriber Identity Module) cards, UICC (Universal Integrated Circuit Cards), and so on. The memory 604 may include at least one computer program thereon. The computer program may be programmed to instruct the processor 602 to perform the various functions described herein, or other related functions. A display mode may be operable to instruct the processor 602 to display various information on the display 606 associated with the lock-detecting system 110.

In embodiments, the lock-detecting system 110 includes the display 606 to present information related to the mode to the pilot. In embodiments, the display 606 may comprise an LCD (Liquid Crystal Diode) display, a TFT (Thin Film Transistor) LCD display, an LEP (Light Emitting Polymer) or PLED (Polymer Light Emitting Diode) display, an OLED (Organic Light-Emitting Diode), and so forth, configured to display text and/or graphical information such as a graphical user interface. The display 606 could also be a three-dimensional display, such as a holographic or semi-holographic display. The display 606 may be backlit via a backlight such that it may be viewed in the dark or other low-light environments, as well as in bright sunlight conditions.

The display 606 may be provided with a screen for entry of data and commands. In one or more implementations, the screen comprises a touch screen. For example, the touch screen may be a resistive touch screen, a surface acoustic wave touch screen, a capacitive touch screen, an infrared touch screen, optical imaging touch screens, dispersive signal touch screens, acoustic pulse recognition touch screens, combinations thereof, and the like. Capacitive touch screens may include surface capacitance touch screens, projected capacitance touch screens, mutual capacitance touch screens, and self-capacitance touch screens. The display 606 may therefore present an interactive portion (e.g., a "soft" keyboard, buttons, etc.) on the touch screen. In some embodiments, the display 606 may also include physical buttons integrated as part of lock-detecting system 110 that may have dedicated and/or multi-purpose functionality, such as those shown in FIG. 7. In other embodiments, the display 606 includes a cursor control device (CCD) that utilizes a mouse, rollerball, trackpad, joystick, buttons, or the like to control and interact with the display 606.

The display 606 may present a user interface which enables pilots, or other users, to share information with the avionics system. The user interface may comprise one or more functionable inputs such as buttons, switches, scroll wheels, a touch screen associated with the display 606, voice recognition elements such as a microphone, pointing devices such as mice, touchpads, tracking balls, styluses, a camera such as a digital or film still or video camera, combinations thereof, etc. For example, the user interface may comprise a control wheel steering (CWS) button for temporarily disengaging envelope protection, as well as an autopilot disconnect (AP DISC) button for turning off all automated systems. Further, the user interface may comprise wired or wireless data transfer elements such as a removable memory, data transceivers, etc., to enable the user and other devices or parties to remotely interface with the lock-detecting system 110. The user interface may also include a speaker for providing audible instructions and feedback. In other embodiments, the computing device 300 may have no display and may instead display information on another system of the aircraft 100, such as the flight display 312 shown in FIG. 3.

Example Procedures

Figure 7:
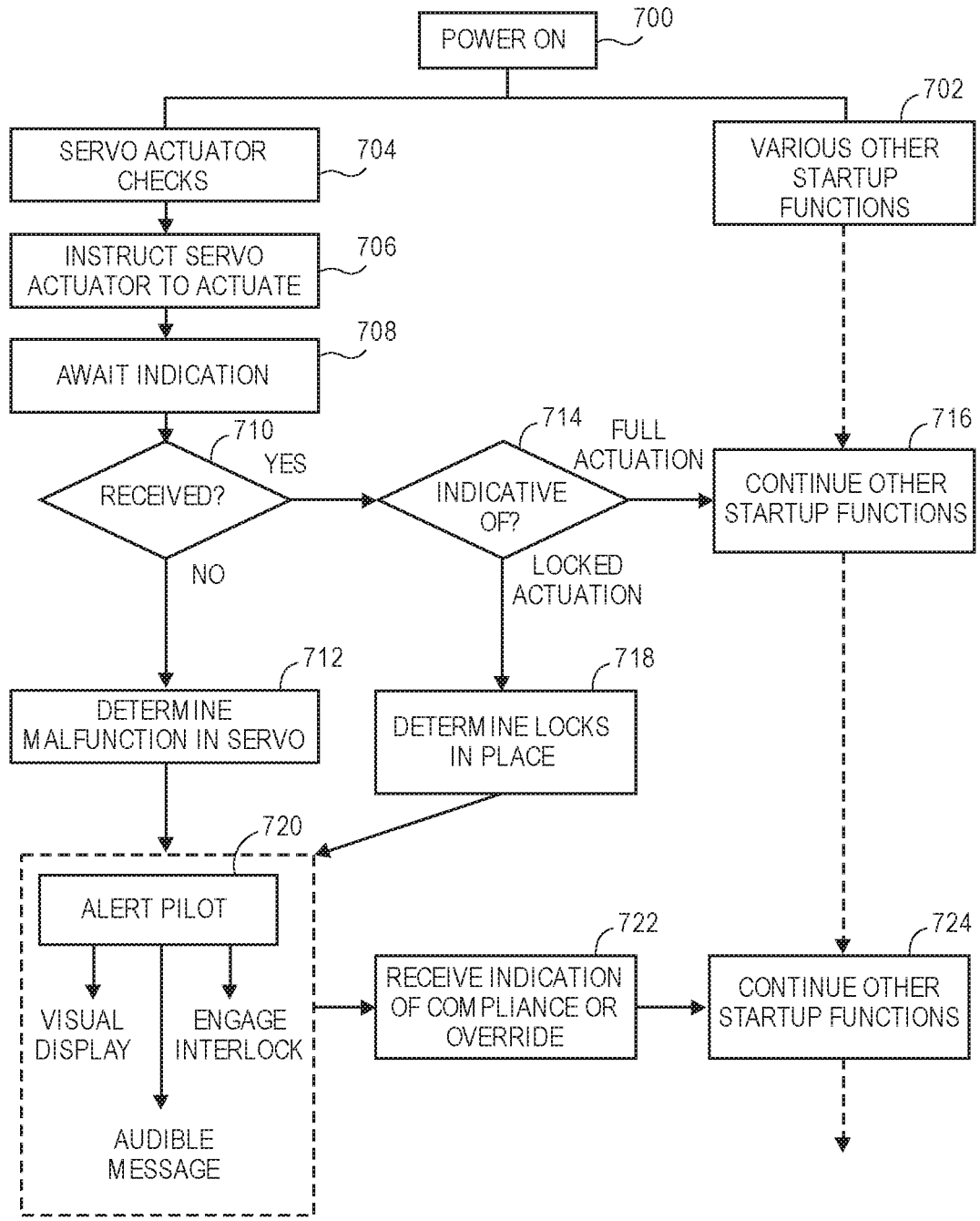
FIG. 7 is a flow diagram illustrating an exemplary method of detecting gust locks on the flight control surfaces.

FIG. 7 illustrates exemplary procedures that can be implemented in a lock-detecting system 110. The procedures can be implemented as operational flows in hardware, firmware, software, or a combination thereof. These operational flows are shown below as a set of blocks that specify operations performed by one or more devices and are not necessarily limited to the orders shown for performing the operations by the respective blocks. The features of the operational flows described below are platform-independent, meaning that the operations can be implemented on a variety of device platforms having a variety of processors.

Generally, any of the functions described herein may be implemented using software, firmware, hardware (e.g., fixed logic circuitry), manual processing, or a combination of these implementations. The terms "module" and "functionality" as used herein generally represent software, firmware, hardware, or a combination thereof. The communication between modules in the lock-detecting system 110 may be wired, wireless, or some combination thereof. In the case of a software implementation, for instance, the module represents executable instructions that perform specified tasks when executed on a processor, such as the processor 602 of the lock-detecting system 110. The program code may be stored in one or more device-readable storage media, an example of which is the memory 604 of the lock-detecting system 110.

In Step 700, the lock-detecting system 110 powers on or receives an indication of a powering on of the lock-detecting system 110. The lock-detecting system 110 may be turned on directly by the pilot, such as by manipulating a power switch on the lock-detecting system 110. The lock-detecting system 110 may also be turned on indirectly by the pilot, such as by manipulating a master power switch for multiple aircraft systems. The lock-detecting system 110 may also be turned on by another aircraft system.

In Step 702, the lock-detecting system 110 begins various startup functions. The various startup functions are begun once the lock-detecting system 110 is powered on or otherwise initiated. For example, power may be provided to the lock-detecting system 110, but the startup sequence is not begun until other aircraft systems are initiated or until instructed to do so by one of those aircraft systems. These may include a wide array of test and pre-flight checks that are performed (which may be known as function check or "PFT"). For example, a system may close a relay to turn on a light to verify that the indicator is working. The pilot is required to verify that this light comes on. The tests may be more sophisticated, such as an end-to-end test (e.g., the system may send data to a third-party system/computer and wait for a reply and then pass the test automatically if the correct data is received).

In Step 704, the lock-detecting system 110 begins servo actuator 302 checks to ensure that the servo actuators 302 are responding, functions, and not locked by a gust lock. The servo actuator 302 may be moved during PFT to ensure basic operation of the motor, internal sensing, and communication. In some embodiments, this operations check for the servo actuator 302 may be performed before, and independent of, the check for the gust locks. In these embodiments, an initial operations check is performed to ensure that the servo actuators 302 are functioning properly. Then, either immediately after or at another time, the servo actuator 302 is instructed to actuate in at least one direction to check for a gust lock on the flight control surface 116 (as discussed below). In other embodiments, there is no independent functions check for the servo actuator 302. Instead, in these embodiments, the servo actuator 302 is initially instructed to fully actuate.

In Step 706, the lock-detecting system 110 instructs the servo actuator 302 to actuate. In configurations, all the servo actuators 302 may be actuation in step 706 or only one or more of the servo actuators 302 may be actuated. This is performed by sending a command to the servo actuator 302 via the communications element 600, or other device for interfacing with the servo actuator 302. The instruction may be for the servo actuator 302 to fully actuate (e.g., to actuate to the farthest extent) in a single direction, fully actuate in both directions (e.g., upward and downward, or left and right), or actuate far enough that a gust lock could be detected (e.g., if the gust lock prevents more than a certain degree of deflection, the test may be to move beyond that certain degree of deflection). Any of these instructions may be considered a "full actuation" instruction. The actuation that is instructed is farther than to simply test for functionality of the servo actuator 302. In configurations, the amount of actuation by the servo actuator 302 may be variable and controlled by the pilot and/or an operator of the aircraft. For instance, depending on airframe configuration, an installed gust lock may allow no deflection of a control surface or some deflection. Thus, system 110 may be configured to allow a pilot or operator to specify the amount of actuation by the servo actuator 302 performed to check for installation of the gust lock.

In some configurations, the system 110 may automatically vary the amount of actuation by the servo actuator 302 based on recorded or saved parameters. For example, the system 110 can utilize the time since its last operation to determine the extent (if any) of the gust lock check. An aircraft that has sat unused for some time (e.g., days) is more likely to have gust locks installed than an aircraft that has sat only for minutes or hours. Thus, using saved time since last operation, the system 110 may determine whether full actuation—or full deflection of the control surfaces—is required or whether partial actuation may be sufficient. Likewise, the system 110 may use real-time and historical weather information (current and past wind speeds for the present location), flight operation information (e.g., engine hours and/or a Hobbs meter), historical deflection information saved by the system 110, and/or other information available to the system 110 via aircraft avionics to determine if full actuation of the servo actuator 302 is required. Further, in some configurations, the servo actuator 302 may be configured to determine if the control surfaces (e.g., rudders, ailerons, elevators) were manually moved by a pilot during a pre-flight inspection. In such configurations, the system 110 may press less or more actuation of the servo actuator 302 (or servo actuators 302) based on pilot behavior. In addition to the alerts described below, the system 110 may additionally alert—or require—the pilot to complete a pre-flight check if it determines the pilot did not manipulate the control surfaces during a pre-flight inspection. In Step 708, the lock-detecting system 110 awaits an indication that the servo actuator 302 is actuating or actuated.

In Step 710, the lock-detecting system 110 determines if the indication has been received. If the indication is not received, in Step 712 the lock-detecting system 110 may determine that the servo actuator 302, the communications element 600, or some other component of the lock-detecting system 110 is not operating as expected. This step may also be performed if a message is received that is indicative that the servo actuator 302 cannot or did not actuate. This may be the case in which a control unit of the servo actuator 302 is working but the motor is not working. The control unit may thus provide an indication of such failure.

If the indication is received, in Step 714 the lock-detecting system 110 analyzes the indication. The indication that is received may be an electronic message, a status signal, or the like. The indication may be received from the controller of the servo actuator 302, the sensor that is mounted near and associated with the flight control surface 116, the flight control device 308, or another aircraft system (or some combination thereof). The indication may be analyzed by the lock-detecting system 110, which may include reading, decoding, deciphering, interpreting, combining, or otherwise determining the implications of the indication.

In some configurations, full deflection of the flight control surface 116 is required to satisfy the gust lock check functionality of system 110. However, in other embodiments, as described above, partial or variable deflection may be sufficient. Thus, in step 714, the system 110 may analyze the indication to determine the amount, or extent of, deflection of the flight control surface 116 compared to a pre-defined and/or variable threshold. For example, depending on aircraft configuration, a gust lock may allow some degree of deflection of the surface(s) 116. Thus, in step 714, the system 110 can analyze the indication to determine and ensure that the surface (s) 116 is deflected beyond that allowed by the gust lock. Similarly, in configurations with variable or dynamic deflection thresholds, the system 110 may analyze the indication to determine if the deflection of the surface(s) 116 satisfied the variable (e.g., pilot set) or dynamic (e.g., automatically determined by the system 110) deflection thresholds.

If the indication is indicative of proper actuation of the control surface, in Step 716 the lock-detecting system 110 continues the other startup functions. For example, if the sensor determines that the flight control surface 116 has fully actuated, this is indicative that the gust lock must have been removed (or never emplaced) by the pilot. As such, the lock-detecting system 110 has determined that the flight control devices 308 (and/or autopilot) are capable of fully articulating the flight control surfaces 116.

If the indication is indicative of a partial, blocked, or locked actuation, in Step 718 lock-detecting system 110 determines that there is a gust lock or other obstruction in place on the flight control surface 116. Because the lock-detecting system 110 is working correctly but unable to actuate the flight control surface 116 as expected, the pilot should remove the gust lock(s). The lock-detecting system 110 may also further test the servo actuator 302 to determine, troubleshoot, or identify the problem. For example, the lock-detecting system 110 may instruct the servo actuator 302 to fully actuate in another direction. As another example, the lock-detecting system 110 may continue these pre-flight tests on the other servo actuators 302 so that the pilot may be informed of all the servo actuators 302 that have gust locks emplaced.

In Step 720, the lock-detecting system 110 alerts the pilot of the detected condition. This can include the detected servo actuator 302 (from Step 712 as discussed above) and/or the detected gust lock in place (from Step 718 discussed above). The alert may be presented to the pilot in any of numerous methods. The alert may include audible alarms, audible voices, visual alarms, visible words, panel annunciations, or the like. The alert may be shown, projected, sounded, or otherwise presented by any of numerous aircraft systems, such as the display 606 of the computing device 300, the flight display 312, a heads-up display, a helmet or headphone worn by the pilot, or other device. The alert ensures that the pilot is aware that the gust lock has been detected. This gives the pilot an opportunity to stop performing other secondary functions and/or attend to the removal of the gust locks from the flight control surfaces 116 of the aircraft 100.

In Step 722, the lock-detecting system 110 receives an indication of compliance or overriding by the pilot. The pilot may provide this input through any of various inputs in the various aircraft systems. Upon receiving this indication, the lock-detecting system 110 may then perform the above steps again for that servo actuator 302 to ensure that the pilot has successfully removed the gust lock. In some embodiments, the system may include an electronic interlock or other device that will prevent the pilot from taking off or taxiing the aircraft 100 until this step has been completed. In Step 724, the lock-detecting system 110 continues the other startup functions.

It should be appreciated that while in the above discussed steps, the servo actuator 302 was discussed as a singular, in embodiments of the invention may utilize a plurality of servo actuators 302 simultaneously or in sequence. For example, the system 119 may comprise at least two servo actuators 302, each associated with the flight control surface of the aircraft such that each servo actuator 302 is configured to supply a force to a flight control surface when engaged. In such configurations, the computing device 300 may be configured to instruct each servo actuator 302 to actuate the flight control surfaces, acquire an indication that at least one of the flight control surfaces did not deflect in response to actuation, and alert a pilot to remove the gust lock.

Similarly, the lock-detecting system 110 may send a single actuation command that is interpreted by all active servo actuators 302 (such that a single instance of Step 706 is performed but multiple indications are received from the single instruction). In embodiments of the invention, the lock-detecting system 110 will utilize more than one servo actuator 302 to control a corresponding more than one flight control surface 116 (or pair of corresponding pair of flight control surfaces 116). The above described steps may be performed for each of these servo actuators 302, or may be performed only on servo actuators 302 that are commonly fitted with gust locks (such as ailerons 118, elevators 120, and rudders 122).

CONCLUSION

Although systems and methods for detecting gust locks have been disclosed in terms of specific structural features and acts, it is to be understood that the appended claims are not to be limited to the specific features and acts described. Rather, the specific features and acts are disclosed as exemplary forms of implementing the claimed devices and techniques.

The invention claimed is:

1. A lock-detecting system configured to be installed in an aircraft to determine if a gust lock is emplaced on a flight control surface, the lock-detecting system comprising:
at least one servo actuator associated with the flight control surface of the aircraft such that the at least one servo actuator is configured to supply a force to a flight control surface when the at least one servo actuator is engaged; and
a computing device configured to—
instruct the at least one servo actuator to actuate the flight control surface,
acquire an indication that the flight control surface did not deflect in response to said actuation by the servo actuator, and
alert a pilot to remove the gust lock from the flight control surface in response to the indication.

2. The lock-detecting system of claim 1, wherein the flight control surface is selected from the group consisting of an aileron, a rudder, and an elevator.

3. The lock-detecting system of claim 1, wherein the computing device is configured to instruct the at least one servo actuator during a startup sequence.

4. The lock-detecting system of claim 1, wherein the at least one servo actuator comprises two servo actuators, each associated with the flight control surface of the aircraft such that each servo actuator is configured to supply a force to a flight control surface when engaged, wherein the computing device is configured to instruct each servo actuator to actuate the flight control surfaces, acquire an indication that at least one of the flight control surfaces did not deflect in response to actuation, and alert a pilot to remove the gust lock from at least one of the two servo actuators in response to the indication.

5. The lock-detecting system of claim 1, wherein the computing device is further configured to:
perform a function check on the servo actuator,
wherein the function check is independent of the step of instructing the at least one servo actuator to actuate.

6. The lock-detecting system of claim 1, wherein the alert is selected from a group consisting of a visual indication, an audible message, and an electronic interlock.

7. The lock-detecting system of claim 1, further comprising:
a sensor associated with the flight control surface,
wherein the computing device is configured to receive the indication from the sensor.

8. The lock-detecting system of claim 1, further comprising:
a sensor associated with the servo actuator,
wherein the computing device is configured to receive the indication from the sensor.

9. A lock-detecting system configured to be installed in an aircraft to determine if a gust lock is emplaced on a flight control surface, the lock-detecting system comprising:
a servo actuator associated with the flight control surface of the aircraft such that the servo actuator is configured to supply a force to a flight control surface when the servo actuator is engaged;
a sensor configured to determine a deflection of the flight control surface; and
a computing device configured to—
instruct the at least one servo actuator to actuate the flight control surface,
acquire, from the flight control surface sensor, an indication that the flight control surface did not deflect in response to said actuation by the servo actuator, and
alert a pilot to remove the gust lock from the flight control surface in response to the indication.

10. The lock-detecting system of claim 9, wherein the flight control surface is selected from the group consisting of an aileron, a rudder, and an elevator.

11. The lock-detecting system of claim 9, wherein the computing device is configured to instruct the at least one servo actuator during a startup sequence.

12. The lock-detecting system of claim 9, wherein the computing device is configured to acquire the indication by receiving a message from the servo.

13. The lock-detecting system of claim 9, wherein the computing device is further configured to:
perform a function check on the servo actuator,
wherein the function check is independent of instructing the at least one servo actuator to actuate.

14. The lock-detecting system of claim 9, wherein the sensor is associated with the flight control surface.

15. The lock-detecting system of claim 9, wherein the sensor is associated with the servo actuator.

16. A lock-detecting system configured to be installed in an aircraft to determine if a gust lock is emplaced on a flight control surface, the lock-detecting system comprising:
a servo actuator associated with the flight control surface of the aircraft such that the servo actuator is configured to supply a force to a flight control surface when the servo actuator is engaged;

wherein the servo actuator includes—
- a motor configured to deflect the flight control surface,
- a microprocessor configured to instruct the motor to deflect the flight control surface, and
- a servo sensor configured to determine a deflection of the flight control surface; and a computing device configured to—
- instruct the at least one servo actuator to actuate the flight control surface,
- acquire, from the servo sensor, an indication that the flight control surface did not deflect in response to said actuation by the servo actuator, and
- alert a pilot to remove the gust lock from the flight control surface in response to the indication.

17. The lock-detecting system of claim 16, wherein the flight control surface is selected from the group consisting of an aileron, a rudder, and an elevator.

18. The lock-detecting system of claim 16, wherein the computing device is configured to instruct the at least one servo actuator during a startup sequence.

19. The lock-detecting system of claim 16, wherein the computing device is further configured to:
perform a function check on the servo actuator,
wherein the function check is independent of instructing the at least one servo actuator to actuate.

20. The lock-detecting system of claim 16, wherein the computing device is configured to alert the pilot if the flight control surface did not fully deflect in response to actuation by the servo actuator.

* * * * *